US010532941B2

(12) United States Patent
Spiegel et al.

(10) Patent No.: US 10,532,941 B2
(45) Date of Patent: *Jan. 14, 2020

(54) SYSTEMS AND METHODS FOR WATER FILTRATION

(71) Applicant: RESPONSE PRODUCTS LIMITED, Hong Kong (CN)

(72) Inventors: Peter G. Spiegel, Sherman Oaks, CA (US); Michael A. Pedersen, Sherman Oaks, CA (US)

(73) Assignee: Aqua Tru LLC, Sherman Oaks, CA (US)

( * ) Notice: Subject to any disclaimer, the term of this patent is extended or adjusted under 35 U.S.C. 154(b) by 425 days.

This patent is subject to a terminal disclaimer.

(21) Appl. No.: 15/238,785

(22) Filed: Aug. 17, 2016

(65) Prior Publication Data

US 2016/0355425 A1    Dec. 8, 2016

Related U.S. Application Data

(63) Continuation of application No. 14/168,342, filed on Jan. 30, 2014, now Pat. No. 9,517,958.

(51) Int. Cl.
*C02F 9/00* (2006.01)
*C02F 1/28* (2006.01)
(Continued)

(52) U.S. Cl.
CPC .......... *C02F 9/005* (2013.01); *B01D 61/025* (2013.01); *C02F 1/283* (2013.01); *C02F 1/441* (2013.01);
(Continued)

(58) Field of Classification Search
CPC ......... B01D 61/02; B01D 61/025; C02F 1/44; C02F 1/28; C02F 1/00; C02F 1/283;
(Continued)

(56) References Cited

U.S. PATENT DOCUMENTS 2,362,852 A     11/1944  Spaulding
3,397,790 A  *  8/1968  Navoy .................... A23L 2/085
                                                210/321.83
(Continued)

FOREIGN PATENT DOCUMENTS

CN          2267241       11/1997
CN        202968269        8/2009
(Continued)

OTHER PUBLICATIONS

PurePro Drinking Water System: PurePro Countertop RO Systems; available at: http://www.purepro.us/astroboy.htm (As viewed Mar. 10, 2014; 3 pgs).
(Continued)

*Primary Examiner* — Robert Clemente
*Assistant Examiner* — Akash K Varma
(74) *Attorney, Agent, or Firm* — Eversheds Sutherland (US) LLP

(57) ABSTRACT

The water filtration system may include a support base. A first receptacle may be detachably disposed on the support base and configured to store source water. A second receptacle may be detachably disposed on the support base and configured to store supply water. A filter system may be disposed between the first receptacle and the second receptacle.

14 Claims, 8 Drawing Sheets

(51) Int. Cl.
*C02F 1/44* (2006.01)
*B01D 61/02* (2006.01)
*C02F 1/00* (2006.01)

(52) U.S. Cl.
CPC ............... *B01D 2311/2626* (2013.01); *B01D 2311/2642* (2013.01); *B01D 2313/50* (2013.01); *C02F 1/003* (2013.01); *C02F 1/442* (2013.01); *C02F 2209/005* (2013.01); *C02F 2209/42* (2013.01); *C02F 2301/046* (2013.01); *C02F 2307/10* (2013.01)

(58) Field of Classification Search
CPC .......... C02F 1/003; C02F 1/441; C02F 1/442; C02F 9/00; C02F 9/005
See application file for complete search history.

(56) References Cited

U.S. PATENT DOCUMENTS

| | | | |
|---|---|---|---|
| 3,959,146 A | 5/1976 | Bray | |
| 4,784,763 A | 11/1988 | Hambleton et al. | |
| 4,842,724 A * | 6/1989 | Bray | B01D 61/08 210/104 |
| 50,000,845 | 3/1991 | Solomon | |
| 5,082,557 A * | 1/1992 | Grayson | B01D 61/10 137/270 |
| 5,122,265 A | 6/1992 | Mora et al. | |
| 5,227,053 A | 7/1993 | Brym | |
| 5,244,579 A | 9/1993 | Horner | |
| 5,296,148 A | 3/1994 | Colangelo et al. | |
| 5,445,729 A | 8/1995 | Ford et al. | |
| 5,658,457 A | 8/1997 | Schoenmeyr | |
| 5,928,503 A | 7/1999 | Shang-Chun | |
| 5,997,738 A * | 12/1999 | Lin | B01D 61/025 210/102 |
| 6,074,551 A | 6/2000 | Jones et al. | |
| 6,099,735 A | 8/2000 | Kelada | |
| 6,190,558 B1 | 2/2001 | Robbins | |
| 7,402,240 B2 | 7/2008 | Kung et al. | |
| 8,252,171 B2 | 8/2012 | Doran | |
| 8,323,484 B2 | 12/2012 | Kung et al. | |
| 2005/0103721 A1* | 5/2005 | Fritze | C02F 1/004 210/744 |
| 2005/0205478 A1 | 9/2005 | Kung et al. | |
| 2007/0045159 A1 | 3/2007 | Lee | |
| 2007/0199875 A1 | 8/2007 | Moorey et al. | |
| 2009/0173683 A1 | 7/2009 | Burrows | |
| 2009/0194478 A1 | 8/2009 | Adam et al. | |
| 2009/0288999 A1 | 11/2009 | Lee | |
| 2012/0261318 A1 | 10/2012 | Yang | |
| 2013/0062219 A1 | 3/2013 | Chang et al. | |
| 2015/0190743 A1 | 7/2015 | Lautzenheiser et al. | |

FOREIGN PATENT DOCUMENTS

| | | |
|---|---|---|
| CN | 201686571 | 12/2010 |
| CN | 202808503 | 3/2013 |
| EP | 2119677 | 11/2009 |
| JP | H08182986 A | 7/1996 |
| JP | 2010149030 A | 7/2010 |
| WO | 1998051628 | 11/1998 |
| WO | 02/076587 A1 | 10/2002 |
| WO | 2002076587 | 10/2002 |
| WO | 2006046074 | 5/2006 |
| WO | 2007078302 | 7/2007 |
| WO | 2009127034 | 10/2009 |

OTHER PUBLICATIONS freshwatersystems.com: Countertop Reverse Osmosis System with Tank Level Control 50 GPD; available at: http://www.freshwatersystems.com/p-8275-countertop-reverse-osmosis-system-with-tank-level-control-50-gpd.aspx (As viewed Mar. 10, 2014; 3 pgs).
WaterTiger.net Countertop Reverse Osmosis Systems; available at http://www.watertiger.net/reverse-osmosis-countertop (As viewed Mar. 10, 2014; 2 pgs).
Sole-Parmer: Virtual Print Catalogue—Water Purification; available at http://www.coleparmer.com/Virtual-Catalog/US/2421 (As viewed Mar. 10, 2014).

* cited by examiner

SYSTEMS AND METHODS FOR WATER FILTRATION

CROSS-REFERENCE TO RELATED APPLICATIONS

The disclosure is a continuation application of U.S. patent application Ser. No. 14/168,342, filed Jan. 30, 2014, which is incorporated herein by reference.

FIELD OF THE DISCLOSURE

The disclosure generally relates to water filtration and more particularly relates to systems and methods for water filtration.

BACKGROUND

Due to increased levels of toxicity caused by chemicals found within the water supply, water filtration has become widespread within many homes. Point-of-use (POU) water treatment devices are designed to treat small amounts of drinking water for use in the home. These devices can sit on the counter, attach to the faucet, or be installed under the sink. They differ from point-of-entry (POE) devices, which are installed on the water line as it enters the home and treats all the water in the building.

Many households today have Reverse-Osmosis (RO) units installed. Reverse-osmosis devices are usually installed underneath the sink, with the tap water connection plumbed directly to the sink cold water supply line, and a waste water drain line connected directly to the sink p-trap. These devices use a membrane that screens out chemicals, such as chloride and sulfate as well as most other contaminates found in the water supply today. A RO system can remove particles down to 1 Angstrom. However POU RO systems can waste as much as 3 to 4 gallons of water for every gallon that is treated. This is due to a continuous flow of water that is required across the membrane surface to remove contamination and to keep the membrane from clogging up.

SUMMARY

Some or all of the above needs and/or problems may be addressed by certain embodiments of the water filtration system disclosed herein. According to an embodiment, the water filtration system may include a support base. A first receptacle may be detachably disposed on the support base and configured to store source water. The first receptacle may include an outlet port and an inlet port. A second receptacle may be detachably disposed on the support base and configured to store supply water. The second receptacle may include an inlet port. A filter system may be disposed between the first receptacle and the second receptacle. The filter system may include an inlet port, a first outlet port, and a second outlet port. In some instances, when the first and second receptacles are attached to the support base, the outlet port of the first receptacle may be disposed in fluid communication with the inlet port of the filter system, the first outlet port of the filter system may be disposed in fluid communication with the inlet port of the first receptacle, and the second outlet port of the filter system may be disposed in fluid communication with the inlet port of the second receptacle.

Other features and aspects of the water filtration system will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
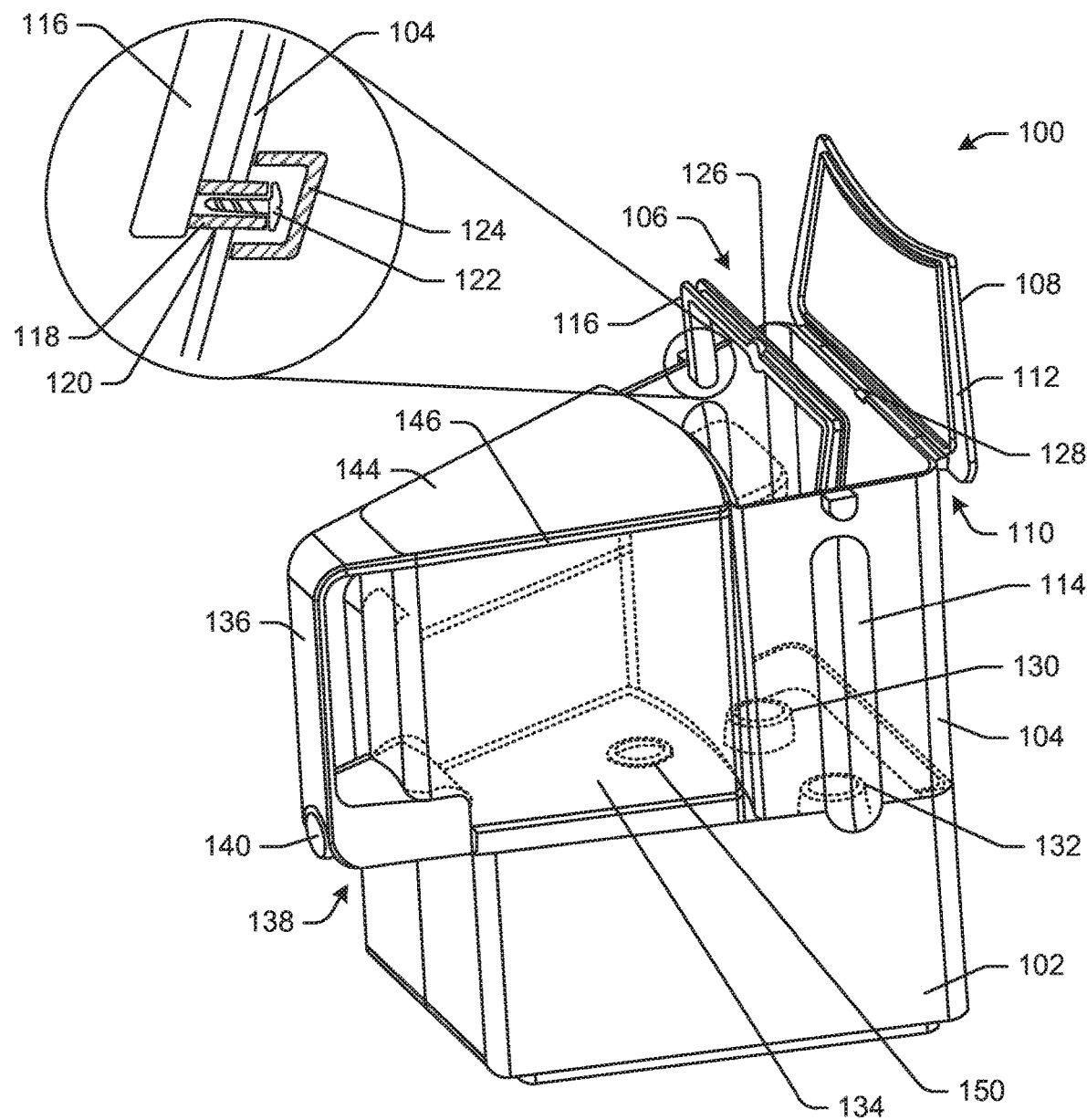
FIG. 1 schematically depicts a water filtration system in accordance with one or more embodiments of the disclosure.

Described below are embodiments of a water filtration system (as well as individual components of the water filtration system). Methods of using the water filtration system are also disclosed. In some instances, the water filtration system may comprise a countertop reverse osmosis water filtration system. The water filtration system may provide the technical advantage and/or solution of working independent from any water source and/or drain. That is, the water filtration system may have no external connections. Moreover, the water filtration system may provide the technical advantage and/or solution of little to no waste water. These and other technical advantages and/or solutions will become apparent throughout the disclosure.

In certain embodiments, the water filtration system may include a support base. The support base may be configured to support the various components of the water filtration system. For example, a first receptacle may be detachably disposed on the support base. The first receptacle may be configured to store source water therein. For example, a user may pour water into the first receptacle, or a user may remove the first receptacle from the support base and fill it with water. In this manner, the first receptacle may include a fill opening configured to receive the water. In some instances, the first receptacle may include an openable lid configured to open and close for providing access to the fill opening. In addition, the first receptacle may include an outlet port and an inlet port.

The water filtration system may include a second receptacle. The second receptacle may be detachably disposed on the support base. The second receptacle may be configured to store supply water therein. In certain embodiments, the second receptacle may include a dispense opening configured to deliver the supply water to a user. In some instances, the second receptacle may include a dispense actuator configured to open and close access to the dispense opening. In this manner, a user may dispense the supply water from the second receptacle. In some instances, the supply water may be used as drinking water. In addition, the second receptacle may include an inlet port.

A filter system may be disposed between the first receptacle and the second receptacle. The filter system may include an inlet port, a first outlet port, and a second outlet port. In some instances, when the first and second receptacles are attached to the support base, the outlet port of the first receptacle may be disposed in fluid communication with the inlet port of the filter system. Moreover, the first outlet port of the filter system may be disposed in fluid communication with the inlet port of the first receptacle. In addition, the second outlet port of the filter system may be disposed in fluid communication with the inlet port of the second receptacle.

In certain embodiments, the filter system may include a number of filters. For example, the filter system may include a first filter, a second filter, and a third filter. The first filter may be configured and disposed to receive water from the inlet port of the filter system and to filter and deliver first filtered water to the second filter. In some instances, the first filter may be a sediment filter or a combination of a sediment filter and a carbon filter. Additional filters may be disposed upstream of the first filter.

The second filter may be configured and disposed to receive the first filtered water from the first filter and to deliver a first portion of the first filtered water to the first outlet port of the filter system. In this manner, the first portion of the first filtered water may comprise waste water that is delivered back to the first receptacle. Moreover, the second filter may be configured to filter and deliver a second portion of the first filtered water to the third filter. The second portion of the first filtered water may comprise second filtered water. In some instances, the second filter may be a reverse osmosis membrane type filter or a nano-filter. In certain embodiments, one or more filters (e.g., the first filter) may be disposed upstream of the second filter. In some instances, one or more filters (e.g. the third filter) may be disposed downstream of the second filter. In yet other embodiments, no filters may be disposed downstream of the second filter.

The third filter may be configured and disposed to receive the second filtered water from the second filter and to filter and deliver third filtered water to the second outlet port of the filter system. In this manner, the third filtered water may comprise the supply water that is delivered to the second receptacle. In some instances, the third filter may be a carbon filter. In other instances, the third filter may be omitted. In such instances, the second filter may be configured to filter and deliver the second portion of the first filtered water to the second receptacle. In yet other instances, additional filters may be disposed downstream of the third filter before the second receptacle.

In certain embodiments, 100% of the water that enters the first filter may pass to the second filter. In another embodiment, less than 100% of the water that enters the second filter may pass to the third filter. For example, about 1% to about 30% of the water that enters the second filter may pass to the third filter, with the remaining water constituting the waste water that is delivered back to the first receptacle. In yet another embodiment, 100% of the water that enters the third filter may pass to the second receptacle. Any percentage of water may enter the first filter, the second filter, or the third filter.

The water filtration system may include a flow restrictor. The flow restrictor may be disposed between and in fluid communication with the first outlet port of the filter system and the inlet port of the first receptacle. The flow restrictor may be configured to create a back pressure on the reverse osmosis membrane. The back pressure may enable the second portion of the first filtered water to pass through the reverse osmosis membrane to produce the second filtered water. Moreover, a return check valve may be disposed between and in fluid communication with the flow restrictor and the inlet port of the first receptacle. The return check valve may be configured to prevent water flow from the first receptacle to the reverse osmosis membrane.

In certain embodiments, a forward check valve may be disposed between and in fluid communication with the second outlet port of the filter system and the inlet port of the second receptacle. The forward check valve may be configured to prevent water flow from the second receptacle to the filter system.

The water filtration system may include a pump disposed between and in fluid communication with the outlet port of the first receptacle and the inlet port of the filter system. In some instances, the pump may be automatically primed by the fluid flow from the outlet port of the first receptacle. For example, the water supplied to the pump may be gravity fed from the outlet port of the first receptacle. The pump may be the sole source for generating hydraulic pressure that facilitates fluid flow from the first receptacle through the filter system to the second receptacle. The pump may facilitate fluid flow from the first receptacle through only a portion of the filter system back to the first receptacle via the flow restrictor.

The water filtration system may include additional components and functionality. For example, the water filtration system may include a UV treatment device, a heater, a chiller, and/or a carbonator. In addition, the water filtration system may include devices capable of adding vitamins to the water and/or re-mineralizing the water.

In certain embodiments, the water filtration system may include a supply of electrical power, an electronic controller, a first sensor disposed and configured to sense a water level in the first receptacle, and a second sensor disposed and configured to sense a water level in the second receptacle. The electronic controller may be disposed in signal communication with the supply of electrical power, the first sensor, the second sensor, and the pump. In some instances, the electrical controller may be configured to sense (via the first sensor) a water level in the first receptacle sufficient enough to enable activation of the pump. The electrical controller also may be configured to sense (via the second sensor) a water level in the second receptacle deficient enough to enable activation of the pump. Moreover, the electrical controller may be configured to activate or deactivate the pump in accordance with the respective water levels in the first and second receptacles.

The supply of electrical power may include an electrical cord connectable to an alternating current (AC) line voltage. In some instances, the AC line voltage may be 120 VAC. In other instances, the supply of electrical power may include at least one direct current (DC) battery. The at least one DC battery may be configured to provide 12 VDC or 24 VDC. The supply of electrical power may include an electrical input port configured to receive a DC voltage.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

FIGS. 1-7 schematically depict a water filtration system 100 (as well as individual components of the water filtration system 100) in accordance with one or more embodiments of the disclosure. In some instances, the water filtration system 100 may comprise a countertop reverse osmosis water filtration system. That is, the water filtration system 100 may be sized and shaped to fit on a countertop and/or within a refrigerator. The water filtration system 100 may be any suitable size and shape. The water filtration system 100 may work independent from any water source and/or drain. That is, the water filtration system 100 may have no external connections. Moreover, the water filtration system 100 may produce little to no waste water.

In certain embodiments, as depicted in FIG. 1, the water filtration system 100 may include a support base 102. The support base 102 may be configured to support and/or house the various components of the water filtration system 100. For example, a first receptacle 104 may be detachably disposed on the support base 102. The first receptacle 104 may be configured to store source water therein. For example, a user may pour water (e.g. tap water) into the first receptacle 104, or a user may remove the first receptacle 104 from the support base 102 and fill it with water (e.g., tap water). In this manner, the first receptacle 104 may include a fill opening 106 configured to receive the water. In some instances, the first receptacle 104 may include an openable lid 108. The openable lid 108 may be configured to open and close for providing access to the fill opening 106. In one example, the openable lid 108 may be attached to the first receptacle 104 by way of a hinge 110 or the like. In some instances, the openable lid 108 may form a lip 112 about the first receptacle 104. A user may engage the lip 112 to open and close the openable lid 108. In addition, the first receptacle 104 may include vertical grooves 114 on each side.

The first receptacle 104 also may include a handle 116. In some instances, the handle 116 may be in rotatable communication with the first receptacle 104. For example, the handle 116 may be attached to an inner portion of the first receptacle 104. That is, the handle 116 may include a protrusion 118 (e.g., a threaded portion) extending through a hole 120 in the first receptacle 104. A fastener 122 (e.g., a screw) may be disposed (or threaded) into the protrusion 118. In some instances, a cap 124 may be disposed over the fastener 122. The handle 116 may include a stop 126 configured to engage a notch 128 in the first receptacle 104. The stop 126 and notch 128 may limit the rotation of the handle 116.

The first receptacle 104 may include an outlet port 130 and an inlet port 132. In some instances, water may exit the first receptacle 104 through the outlet port 130. Water also may enter the first receptacle 104 by way of the inlet port 132.

Figure 2:
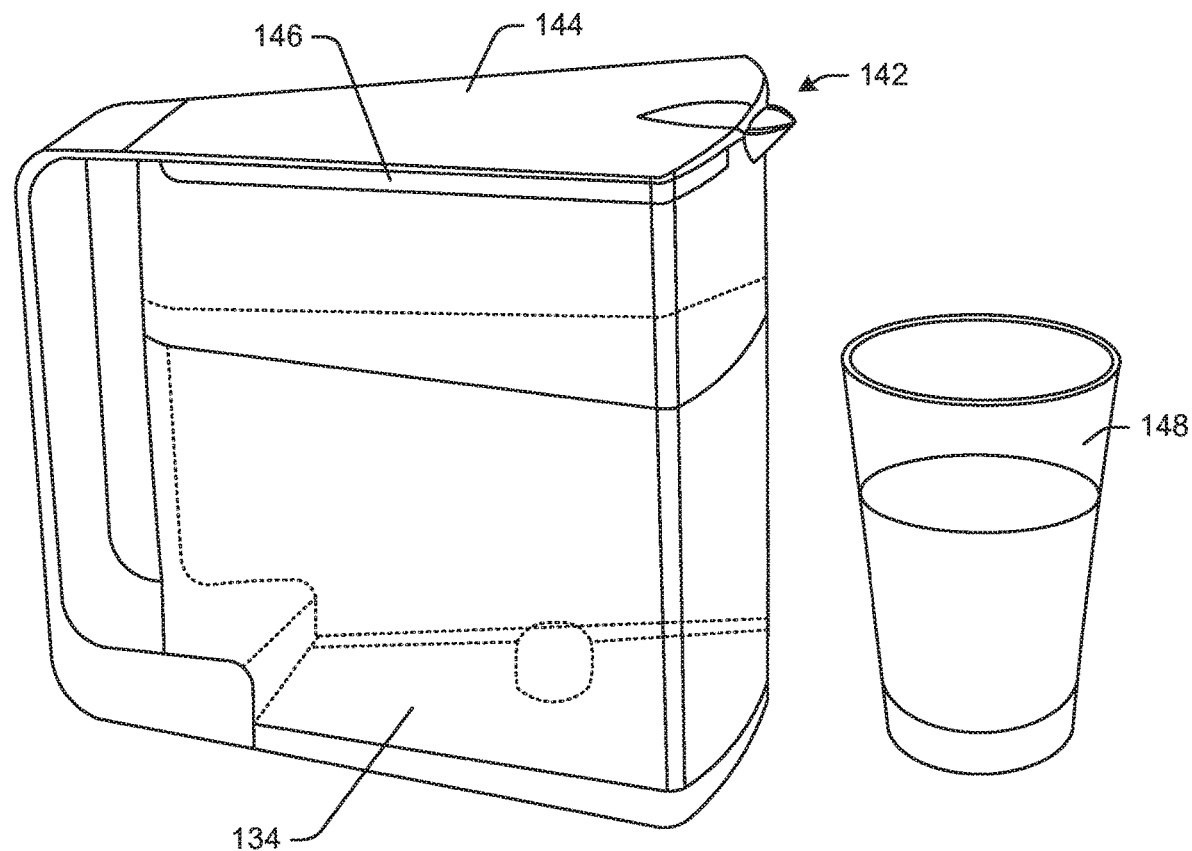
FIG. 2 schematically depicts a portion of a water filtration system in accordance with one or more embodiments of the disclosure.

The water filtration system 100 may include a second receptacle 134. The second receptacle 134 may be detachably disposed on the support base 102. In some instances, the second receptacle 134 may include a handle 136 for removing and inserting the second receptacle 134 to the support base 102. The second receptacle 134 may be configured to store supply water (e.g., filtered drinking water) therein. In certain embodiments, the second receptacle 134 may include a dispense opening 138 configured to deliver the supply water to a user. In some instances, the second receptacle 134 may include a dispense actuator 140 configured to open and close access to the dispense opening 138. In one example embodiment, the dispense actuator 140 may be disposed on the handle 136. In this manner, a user may dispense the supply water from the second receptacle 134. In other instances, as depicted in FIG. 2, a user may dispense the supply water from an opening 142 disposed about a lid 144 of the second receptacle 134. In some instances, the lid 144 may be removable from the second receptacle 134. The lid 144 also may form a lip 146 about the second receptacle 134. In some instances, the supply water may be used as drinking water. For example, a user may dispense the supply water from the second receptacle 134 to a cup 148 or the like. In addition, referring back to FIG. 1, the second receptacle 134 may include an inlet port 150. In some instances, the inlet port 150 may be disposed away from the handle 136 side of the second receptacle 134 to stabilize the second receptacle 134 when docked on the support base 102.

Figure 3:
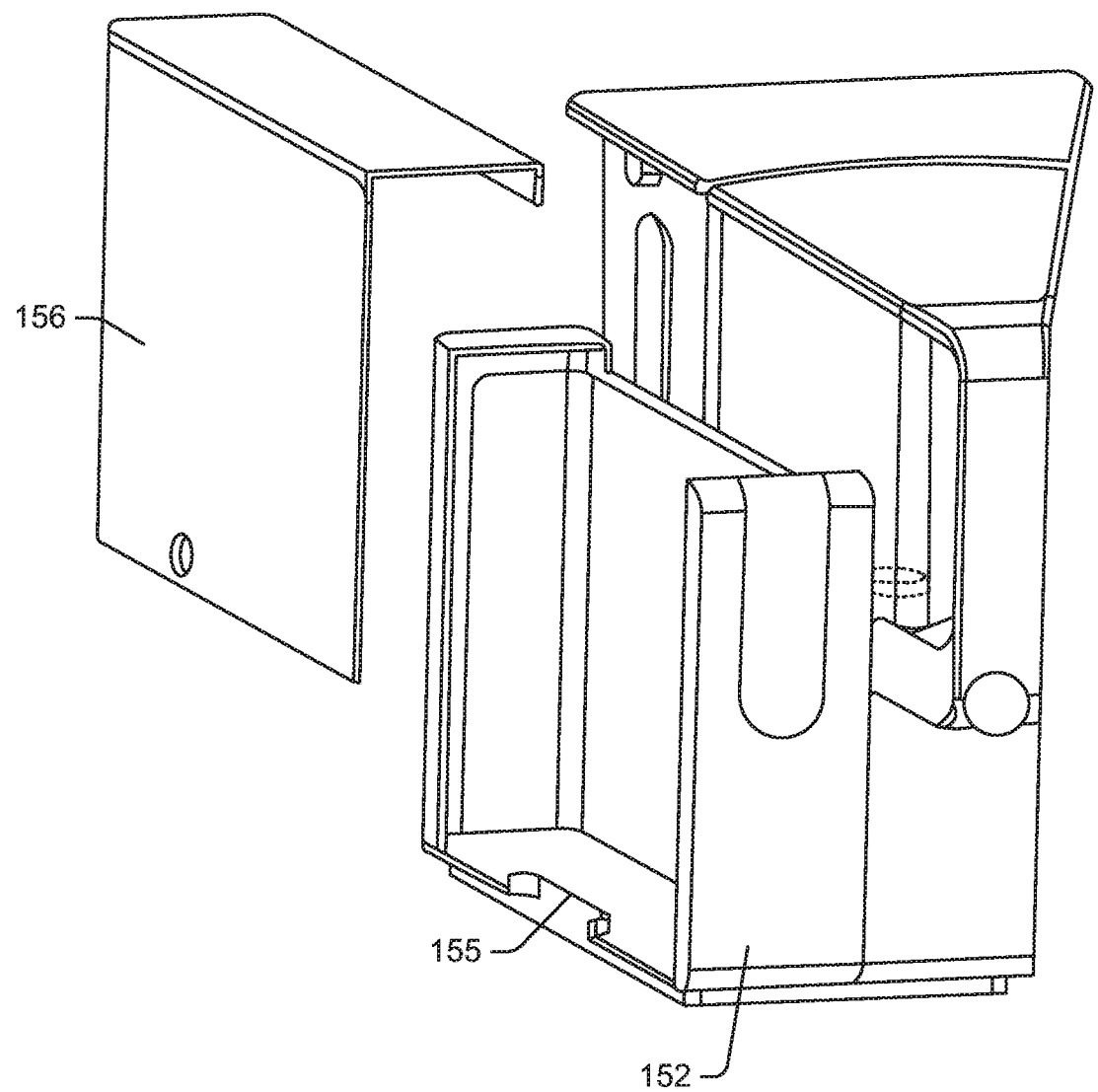
FIG. 3 schematically depicts a partially exploded view of a water filtration system in accordance with one or more embodiments of the disclosure.

As depicted in FIG. 3, the support base 102 may include a filter compartment 152. At least a portion of a filter system 154 may be disposed between the first receptacle 104 and the second receptacle 134 within the filter compartment 152. The filter compartment 152 may include a removable panel 156 for accessing the filter system 154. In some instances, the filter compartment 152 may include a cutout portion 155 for removing the panel 156.

Figure 4:
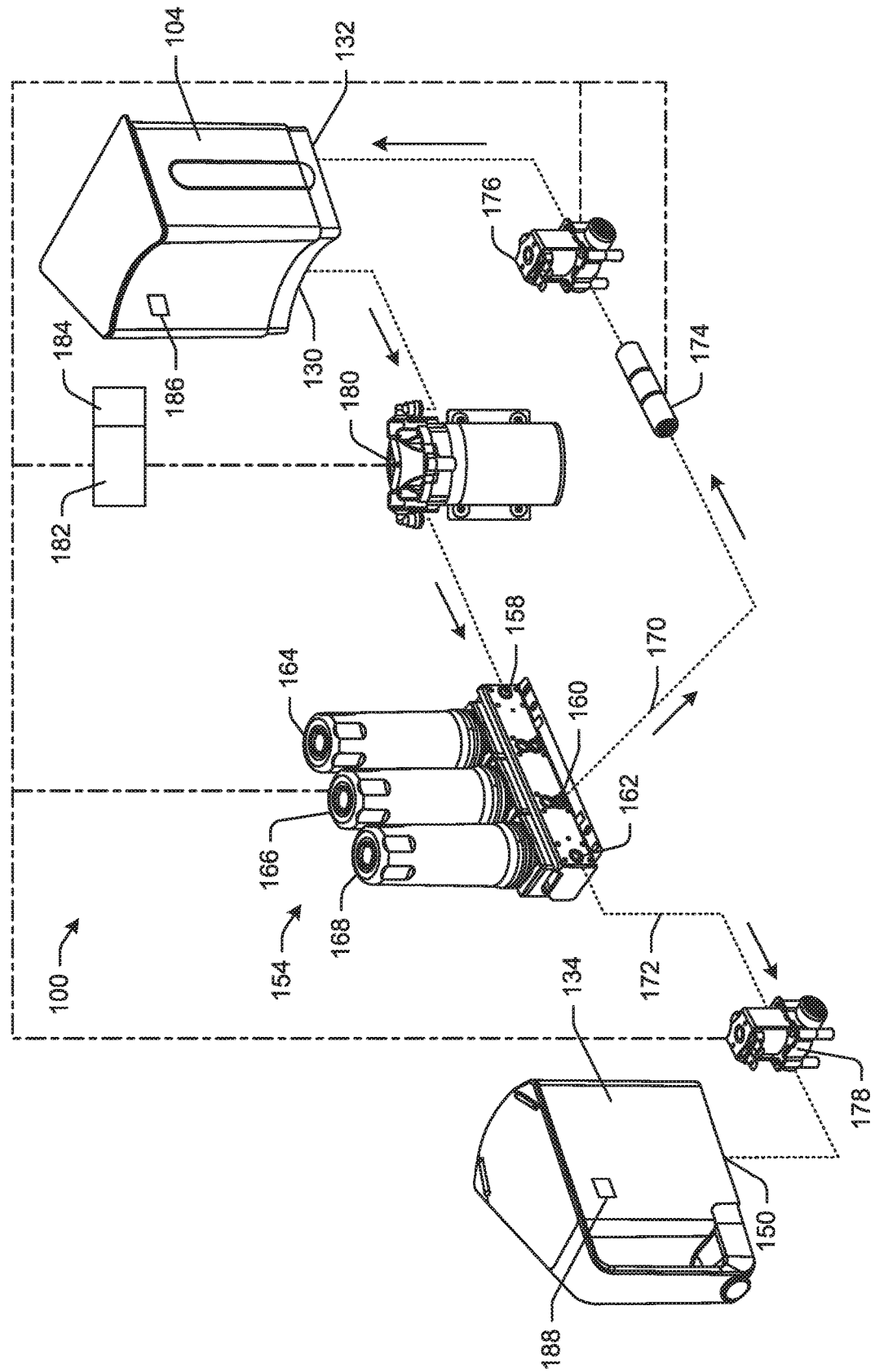
FIG. 4 schematically depicts a portion of a water filtration system in accordance with one or more embodiments of the disclosure.

As depicted in FIG. 4, the filter system 154 may include an inlet port 158, a first outlet port 160, and a second outlet port 162. In some instances, when the first receptacle 104 and the second receptacle 134 are attached to the support base 102, the outlet port 130 of the first receptacle 104 may be disposed in fluid communication with the inlet port 158 of the filter system 154. Moreover, the first outlet port 160 of the filter system 154 may be disposed in fluid communication with the inlet port 132 of the first receptacle 104. In addition, the second outlet port 162 of the filter system 154 may be disposed in fluid communication with the inlet port 150 of the second receptacle 134.

In certain embodiments, the filter system 154 may include a first filter 164, a second filter 166, and a third filter 168. Additional or fewer filters may be used. The first filter 164 may be configured and disposed to receive water from the inlet port 158 of the filter system 154 and to filter and deliver first filtered water to the second filter 166. In some instances, the first filter 164 may be a sediment filter or a combination of a sediment filter and a carbon filter. The first filter 164 may comprise any suitable filter. In some instances, additional filters may be disposed upstream of the first filter 164.

The second filter 166 may be configured and disposed to receive the first filtered water from the first filter 164 and to deliver a first portion of the first filtered water to the first outlet port 160 of the filter system 154. In this manner, the first portion of the first filtered water may comprise waste water 170 that is delivered back to the first receptacle 104. Moreover, the second filter 166 may be configured to filter and deliver a second portion of the first filtered water to the third filter 168. The second portion of the first filtered water may comprise second filtered water. In some instances, the second filter 166 may be a reverse osmosis membrane type filter. The second filter 166 may be any suitable filter.

The third filter 168 may be configured and disposed to receive the second filtered water from the second filter 166 and to filter and deliver third filtered water to the second outlet port 162 of the filter system 154. In this manner, the third filtered water may comprise the supply water 172 that is delivered to the second receptacle 134. In some instances, the third filter 168 may be a carbon filter. The third filter 168 may be any suitable filter. In other instances, the third filter 168 may be omitted. In such instances, the second filter 166 may be configured to filter and deliver the second portion of the first filtered water to the second receptacle 134. In yet other instances, additional filters may be disposed downstream of the third filter 168 before the second receptacle 134.

In certain embodiments, about 100% of the water that enters the first filter 164 may pass to the second filter 166. In another embodiment, less than 100% of the water that enters the second filter 166 may pass to the third filter 168. For example, about 1% to about 30% of the water that enters the second filter 166 may pass to the third filter 168, with the remaining water constituting the waste water 170 that is delivered back to the first receptacle 104. In yet another embodiment, about 100% of the water that enters the third filter 168 may pass to the second receptacle 134. This process is repeated as needed.

The water filtration system 100 may include a flow restrictor 174. The flow restrictor 174 may be disposed between and in fluid communication with the first outlet port 160 of the filter system 154 and the inlet port 132 of the first receptacle 104. The flow restrictor 174 may be configured to create a back pressure in the second filter 166 (e.g., on the reverse osmosis membrane). The back pressure may enable the second portion of the first filtered water to pass through the reverse osmosis membrane to produce the second filtered water. Moreover, a return check valve 176 may be disposed between and in fluid communication with the flow restrictor 174 and the inlet port 132 of the first receptacle 104. The return check valve 176 may be configured to prevent water flow from the first receptacle 104 to the filter system 154.

In certain embodiments, a forward check valve 178 may be disposed between and in fluid communication with the second outlet port 162 of the filter system 154 and the inlet port 150 of the second receptacle 134. The forward check valve 178 may be configured to prevent water flow from the second receptacle 134 to the filter system 154.

The water filtration system 100 may include a pump 180 disposed between and in fluid communication with the outlet port 130 of the first receptacle 104 and the inlet port 158 of the filter system 154. In some instances, the pump 180 may be automatically primed by the fluid flow from the outlet port 130 of the first receptacle 104. For example, the water supplied to the pump 180 may be gravity fed from the outlet port 130 of the first receptacle 104. The pump 180 may be the sole source for generating hydraulic pressure that facilitates fluid flow from the first receptacle 104 through the filter system 154 to the second receptacle 134. In some instances, the pump 180 may facilitate fluid flow from the first receptacle 104 through only a portion of the filter system 154 and back to the first receptacle 104 via the flow restrictor 174.

In certain embodiment, the water filtration system 100 may include a supply of electrical power 182, an electronic controller 184, a first sensor 186 disposed and configured to sense a water level in the first receptacle 104, and a second sensor 188 disposed and configured to sense a water level in the second receptacle 134. The electronic controller 184 may be disposed in signal communication with the supply of electrical power 182, the first sensor 186, the second sensor 188, and the pump 180. In some instances, the electrical controller 184 may be configured to sense, via the first sensor 186, a water level in the first receptacle 104 sufficient enough to enable activation of the pump 180. The electrical controller 184 also may be configured to sense, via the second sensor 188, a water level in the second receptacle 134 deficient enough to enable activation of the pump 180. Moreover, the electrical controller 184 may be configured to activate or deactivate the pump 180 in accordance with the respective water levels in the first receptacle 104 and the second receptacle 134. In other instances, the electric power 182 and/or the electrical controller 184 may be in communication with one or more of the filter system 154, the flow restrictor 174, the return check valve 176, and/or the forward check valve 178.

The supply of electrical power 182 may include an electrical cord connectable to an alternating current (AC) line voltage. In some instances, the AC line voltage may be 120 VAC. In other instances, the supply of electrical power 182 may include at least one direct current (DC) battery. The at least one DC battery may be configured to provide 12 VDC or 24 VDC. The supply of electrical power 182 may include an electrical input port configured to receive a DC voltage.

Figure 5:
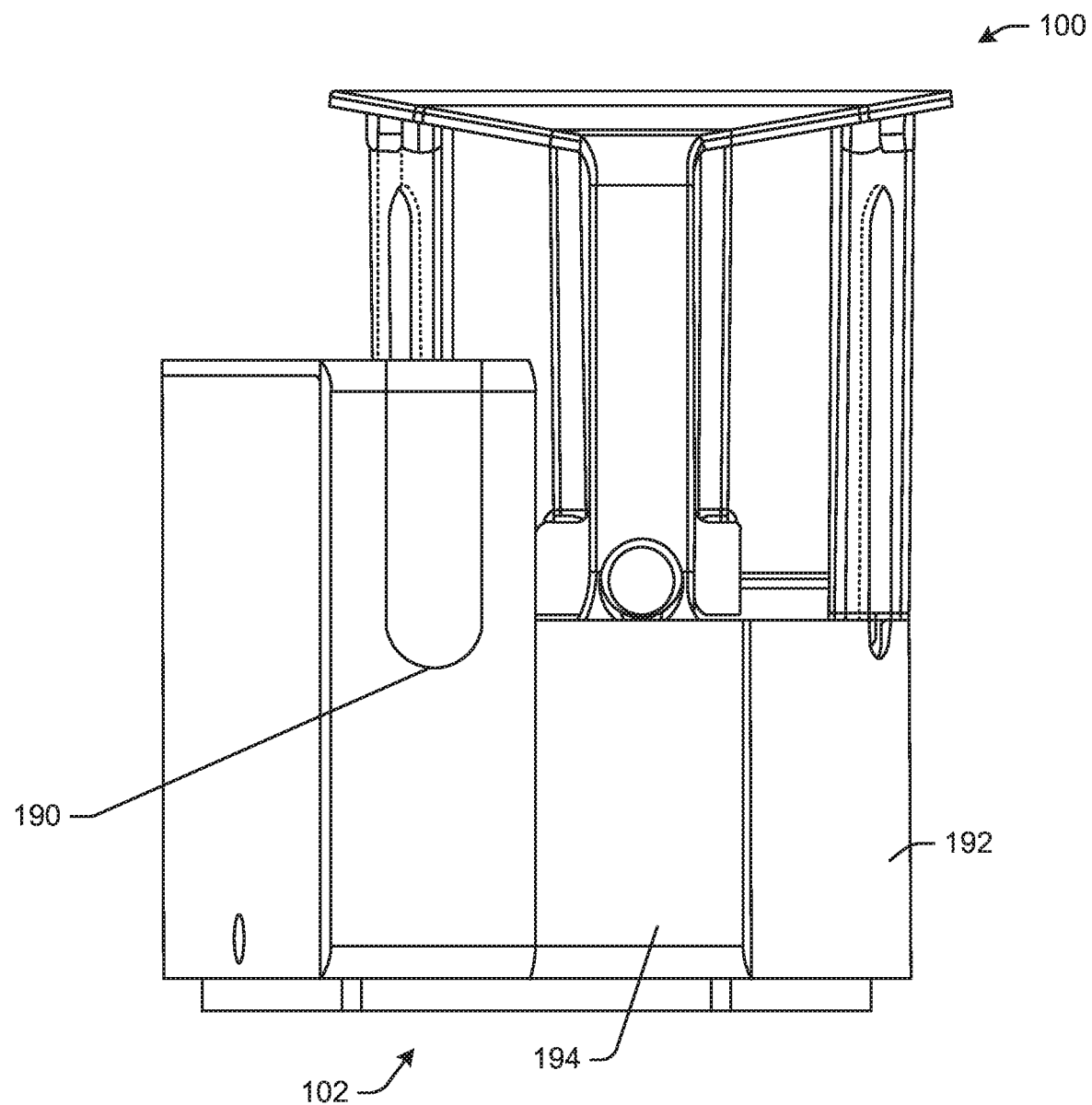
FIG. 5 schematically depicts a water filtration system in accordance with one or more embodiments of the disclosure.

In certain embodiments, as depicted in FIG. 5, the water filtration system 100 may include a control panel 190. In some instances, the control panel 190 may be disposed on the support base 102. The control panel 190 may include one or more user accessible buttons for controlling the water filtration system 100. For example, the control panel 190 may enable a user to turn the water filtration system 100 on or off. Moreover, the control panel 190 may include one or more indicators configured to provide the user with an indication of the status of the water filtration system 100. For example, the indicators may denote that the water filtration system 100 is actively filtering water, that the second receptacle 134 is full, that the first receptacle 104 is empty, and/or that the filter system 154 (e.g., the first filter 164, the second filter 166, and/or the third filter 168) should be replaced or cleaned, etc.

Figure 6:
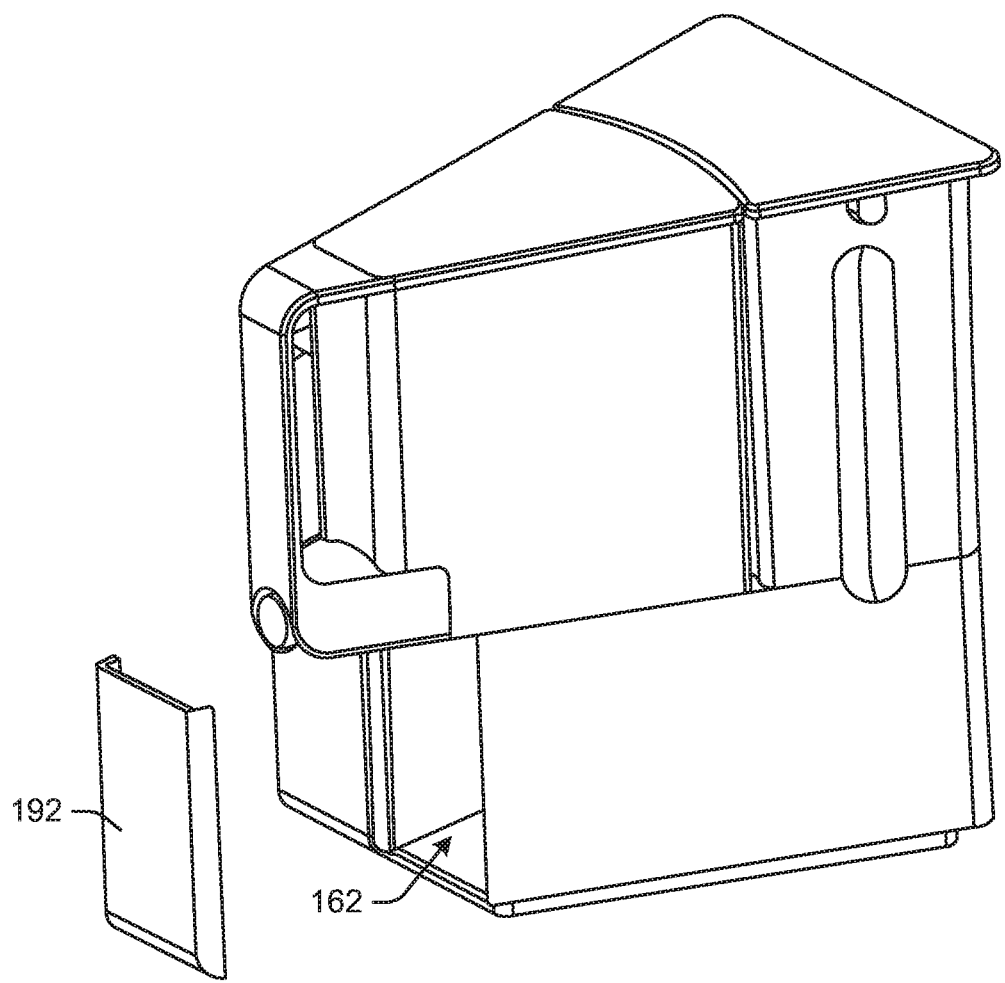
FIG. 6 schematically depicts a partially exploded view of a water filtration system in accordance with one or more embodiments of the disclosure.
Figure 7:
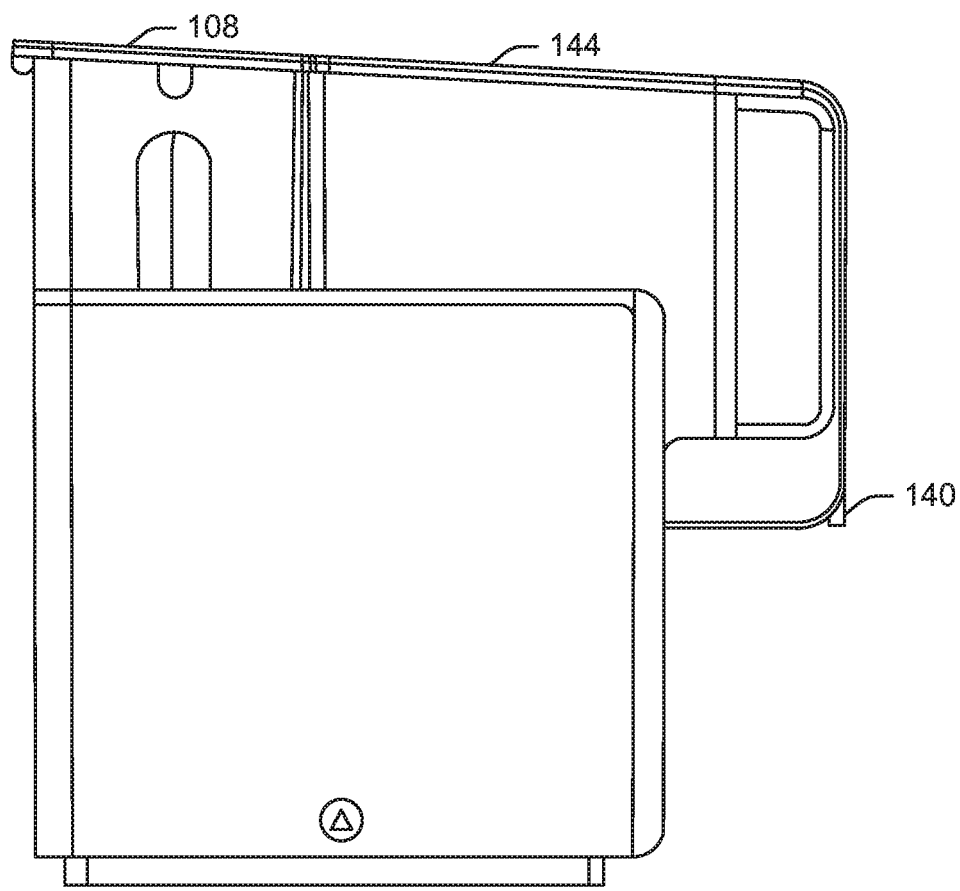
FIG. 7 schematically depicts a water filtration system in accordance with one or more embodiments of the disclosure.

In some instances, as depicted in FIGS. 5 and 6, the support base 102 may include a utility compartment 192 configured to house at least a portion of the filter system 154, the flow restrictor 174, the return check valve 176, the forward check valve 178, and/or the pump 180. The utility compartment 192 may include a removable panel 194 for accessing one or more of the various components of the water filtration system 100. In certain embodiments, as depicted in FIG. 7, the openable lid 108 and the removable lid 144 may be angled downward towards the dispense actuator 140.

Illustrative Methods

Figure 8:
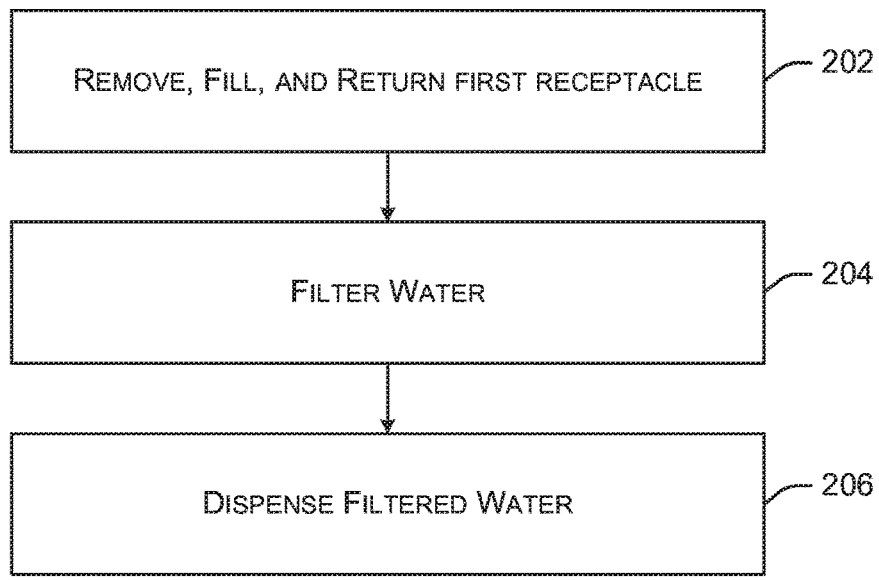
FIG. 8 is a flow diagram depicting an illustrative method for filtering water in accordance with one or more embodiments of the disclosure.

FIG. 8 is a flow diagram depicting an illustrative method 200 for filtering water with the water filtration system 100 in accordance with one or more embodiments of the disclosure.

At block 202 of method 200, the first receptacle 104 may be removed from the support base 102, filled with water, and returned back to the support base 102. For example, a user may pour water (e.g. tap water) into the first receptacle 104, or a user may remove the first receptacle 104 from the support base 102 and fill it with water (e.g., tap water). The user may open the openable lid 108 and pour water into the fill opening 106. In some instances, a user may engage the lip 112 to open and close the openable lid 108.

Upon returning the first receptacle filled with water back to the support base at block 202, the water may be filtered by the filter system at block 204. That is, when the first receptacle 104 and the second receptacle 134 are attached to the support base 102, the outlet port 130 of the first receptacle 104 may be disposed in fluid communication with the inlet port 158 of the filter system 154. Moreover, the first outlet port 160 of the filter system 154 may be disposed in fluid communication with the inlet port 132 of the first receptacle 104. In addition, the second outlet port 162 of the filter system 154 may be disposed in fluid communication with the inlet port 150 of the second receptacle 134.

The first filter 164 may be configured and disposed to receive water from the inlet port 158 of the filter system 154 and to filter and deliver first filtered water to the second filter 166. In some instances, the first filter 164 may be a sediment filter or a combination of a sediment filter and a carbon filter. The first filter 164 may comprise any suitable filter.

The second filter 166 may be configured and disposed to receive the first filtered water from the first filter 164 and to deliver a first portion of the first filtered water to the first outlet port 160 of the filter system 154. In this manner, the first portion of the first filtered water may comprise waste water 170 that is delivered back to the first receptacle 104. Moreover, the second filter 166 may be configured to filter and deliver a second portion of the first filtered water to the third filter 168. The second portion of the first filtered water may comprise second filtered water. In some instances, the second filter 166 may be a reverse osmosis membrane type filter. The second filter 166 may be any suitable filter.

The third filter 168 may be configured and disposed to receive the second filtered water from the second filter 166 and to filter and deliver third filtered water to the second outlet port 162 of the filter system 154. In this manner, the third filtered water may comprise the supply water 172 that is delivered to the second receptacle 134. In some instances, the third filter 168 may be a carbon filter. The third filter 168 may be any suitable filter.

At block 206 of method 200, the filtered water may be dispensed from the second receptacle. For example, the second receptacle 134 may be configured to store supply water (e.g., filtered drinking water) therein. A user may dispense the supply water from the second receptacle 134 by manipulating the dispense actuator 140. In other instances, a user may dispense the supply water from the opening 142 disposed about the lid 144 of the second receptacle 134. For example, a user may dispense the supply water from the second receptacle 134 to a cup 148 or the like.

In certain embodiments, the steps described in blocks 202-206 of method 200 may be performed in any order. The steps described in blocks 202-206 of method 200 are but one example of several embodiments. For example, certain steps may be omitted, while other steps may be added.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A point-of-use countertop water filtration system, comprising:
   a support base;
   a first receptacle detachably disposed on the support base and configured to store source water, the first receptacle comprising an outlet port and an inlet port;
   a second receptacle detachably disposed on the support base and configured to store supply water, the second receptacle comprising an inlet port; and
   a filter system disposed between the first receptacle and the second receptacle, the filter system comprising
      an inlet port, a first outlet port, and a second outlet port,
      a first filter comprising a sediment filter or a combination of a sediment filter and a carbon filter,
      a second filter comprising a reverse osmosis membrane, and
      a third filter comprising a carbon filter,
      wherein the first filter is configured and disposed to receive water from the inlet port of the filter system and to filter and deliver first filtered water to the second filter,
      wherein the second filter is configured and disposed to receive the first filtered water from the first filter, to deliver a first portion of the first filtered water to the first outlet port of the filter system, the first portion of the first filtered water being waste water that is delivered back to the first receptacle, and to filter and deliver a second portion of the first filtered water, the second portion of the first filtered water being second filtered water,
      wherein the third filter is disposed between the second filter and the second receptacle and is configured to receive the second filtered water from the second filter and to filter and deliver third filtered water to the second outlet port of the filter system;
   wherein, when the first and second receptacles are attached to the support base, the outlet port of the first receptacle is disposed in fluid communication with the inlet port of the filter system, the first outlet port of the filter system is disposed in fluid communication with the inlet port of the first receptacle, and the second outlet port of the filter system is disposed in fluid communication with the inlet port of the second receptacle.

2. The water filtration system of claim 1, wherein:
   the first receptacle further comprises a fill opening configured to receive source water; and the second receptacle further comprises a dispense opening configured to deliver supply water to a user.

3. The water filtration system of claim 2, wherein:
the first receptacle further comprises an openable lid configured to open and close access to the fill opening; and
the second receptacle further comprises a dispense actuator configured to open and close access to the dispense opening.

4. The water filtration system of claim 1, wherein:
100% of the water that enters the first filter passes to the second filter;
less than 100% of the water that enters the second filter passes to the third filter; and
100% of the water that enters the third filter passes to the second receptacle.

5. The water filtration system of claim 1, wherein:
about 1% to about 30% of the water that enters the second filter passes to the third filter, with remaining water constituting the waste water that is delivered back to the first receptacle.

6. The water filtration system of claim 1, further comprising:
a flow restrictor disposed between and in fluid communication with the first outlet port of the filter system and the inlet port of the first receptacle, the flow restrictor being set to create a back pressure on the second filter that enables the second portion of the first filtered water to pass through the second filter to produce the second filtered water.

7. The water filtration system of claim 6, further comprising:
a return check valve disposed between and in fluid communication with the flow restrictor and the inlet port of the first receptacle, the return check valve being configured to prevent water flow from the first receptacle to the reverse osmosis membrane.

8. The water filtration system of claim 1, further comprising:
a forward check valve disposed between and in fluid communication with the second outlet port of the filter system and the inlet port of the second receptacle, the forward check valve being configured to prevent water flow from the second receptacle to the filter system.

9. The water filtration system of claim 1, further comprising:
a pump disposed between and in fluid communication with the outlet port of the first receptacle and the inlet port of the filter system.

10. The water filtration system of claim 9, wherein the pump is automatically primed by the fluid flow from the outlet port of the first receptacle to the pump being configured to be gravity fed.

11. The water filtration system of claim 9, wherein the pump is the sole source for generating hydraulic pressure that facilitates fluid flow from the first receptacle through the filter system to the second receptacle, and that facilitates fluid flow from the first receptacle through only a portion of the filter system back to the first receptacle via a flow restrictor.

12. The water filtration system of claim 1, wherein the filter system comprises:
a filter base comprising the inlet port, the first outlet port, and the second outlet port,
wherein the first filter, the second filter, and the third filter are disposed on top of and attached to a top portion of the filter base;
wherein the outlet port of the first receptacle is disposed in fluid communication with the inlet port of the filter system, wherein the first outlet port of the filter system is disposed in fluid communication with the inlet port of the first receptacle, and wherein the second outlet port of the filter system is disposed in fluid communication with the inlet port of the second receptacle.

13. A point-of-use countertop water filtration system, comprising:
a support base;
a first receptacle disposed on the support base and configured to store source water, the first receptacle comprising an outlet port and an inlet port;
a second receptacle disposed on the support base and configured to store supply water, the second receptacle comprising an inlet port; and
a filter system disposed between the first receptacle and the second receptacle, the filter system comprising
an inlet port, a first outlet port, and a second outlet port,
a sediment and/or carbon filter,
an RO filter, and
a carbon filter,
wherein the sediment and/or carbon filter is configured and disposed to receive water from the inlet port of the filter system and to filter and deliver first filtered water to the RO filter,
wherein the RO filter is configured and disposed to receive the first filtered water from the sediment and/or carbon filter, to deliver a first portion of the first filtered water to the first outlet port of the filter system, the first portion of the first filtered water being waste water that is delivered back to the first receptacle, and to filter and deliver a second portion of the first filtered water, the second portion of the first filtered water being second filtered water,
wherein the carbon filter is disposed between the RO filter and the second receptacle and is configured to receive the second filtered water from the RO filter and to filter and deliver third filtered water to the second outlet port of the filter system;
wherein the outlet port of the first receptacle is disposed in fluid communication with the inlet port of the filter system, the first outlet port of the filter system is disposed in fluid communication with the inlet port of the first receptacle, and the second outlet port of the filter system is disposed in fluid communication with the inlet port of the second receptacle.

14. A point-of-use countertop water filtration system, comprising:
a support base;
a first receptacle disposed on the support base and configured to store source water;
a second receptacle disposed on the support base and configured to store supply water; and
a filter system disposed between the first receptacle and the second receptacle, the filter system comprising
sediment and/or carbon filters,
an RO filter, and
a carbon filter,
wherein the sediment and/or carbon filters are configured to filter and deliver first filtered water to the RO filter,
wherein the RO filter is configured and disposed to receive the first filtered water from the sediment and/or carbon filters, to deliver a first portion of the first filtered water to the first receptacle, the first portion of the first filtered water being waste water that is delivered back to the first receptacle, and to filter and deliver a second portion of the first filtered water, the second portion of the first filtered water being second filtered water, wherein the carbon filter is disposed between the RO filter and the second receptacle and is configured to receive the second filtered water from the RO filter and to filter and deliver third filtered water to the second receptacle.

\* \* \* \* \*